United States Patent

[11] 3,596,060

[72] Inventors Edward Camp Tibbals, Jr.;
Trevor Temple, both of Boulder, Colo.
[21] Appl. No. 636,204
[22] Filed May 4, 1967
[45] Patented July 27, 1971
[73] Assignee Alexander, Inc.
Mahwah, N.J.

[54] OPTICAL SCANNING UNIT FOR MARK SENSING
2 Claims, 7 Drawing Figs.
[52] U.S. Cl. .................................................. 235/61.11E,
250/219 D, 350/99
[51] Int. Cl. ..................................................... G01n 21/30,
G02b 5/12, G06k 7/00
[50] Field of Search........................................... 235/61.11,
61.115; 250/219 IDC, 219 ID, 217 SSL; 350/99 X,
96, 113; 178/7.1, 7.6

[56] References Cited
UNITED STATES PATENTS
| | | | |
|---|---|---|---|
| 2,297,851 | 10/1942 | Wyss............................ | 350/96 |
| 3,060,319 | 10/1962 | Greunke...................... | 250/219 IDC |
| 3,433,933 | 3/1969 | Hardin......................... | 250/219 ID X |
| 3,443,109 | 5/1969 | Broom et al. ................. | 250/219 ID X |
| 3,463,882 | 8/1969 | Herbold....................... | 178/7.1 |

OTHER REFERENCES
Rohland, " Multi-Input, Optical Scanning Data Collection Terminal" IBM Technical Disclosure Bulletin, Vol. 8, No. 10, March 1966, pg. 1405 & 1406

*Primary Examiner*—Thomas A. Robinson
*Assistant Examiner*—Thomas J. Sloyan
*Attorneys*—Albert C. Johnston, Robert E. Isner, Lewis H. Eslinger and Alvin Sinderbrand ABSTRACT: Optical-scanning system for a mark sensing unit wherein a laser beam is deflected through a predetermined arc to traverse a predetermined lineal distance on a record disposed chordally with respect thereto. A beam-splitting device disposed adjacent to the scanned surface directs a portion of the laser beam through an auxiliary clocking grid having a series of apertures sized and spaced in complemental accord with the format of the document being scanned. The varying intensity pattern produced by the passage of the split beam along the clocking grid is converted into a sequence of discrete electrical signals that is readily correlatable with other electrical signals that represent the presence or absence by marks on the scanned document as evidenced by intensity variation induced by the passage of the laser beam therepast to thereby provide a direct and accurate indication of beam location at all times independent of the nature of its displacement.

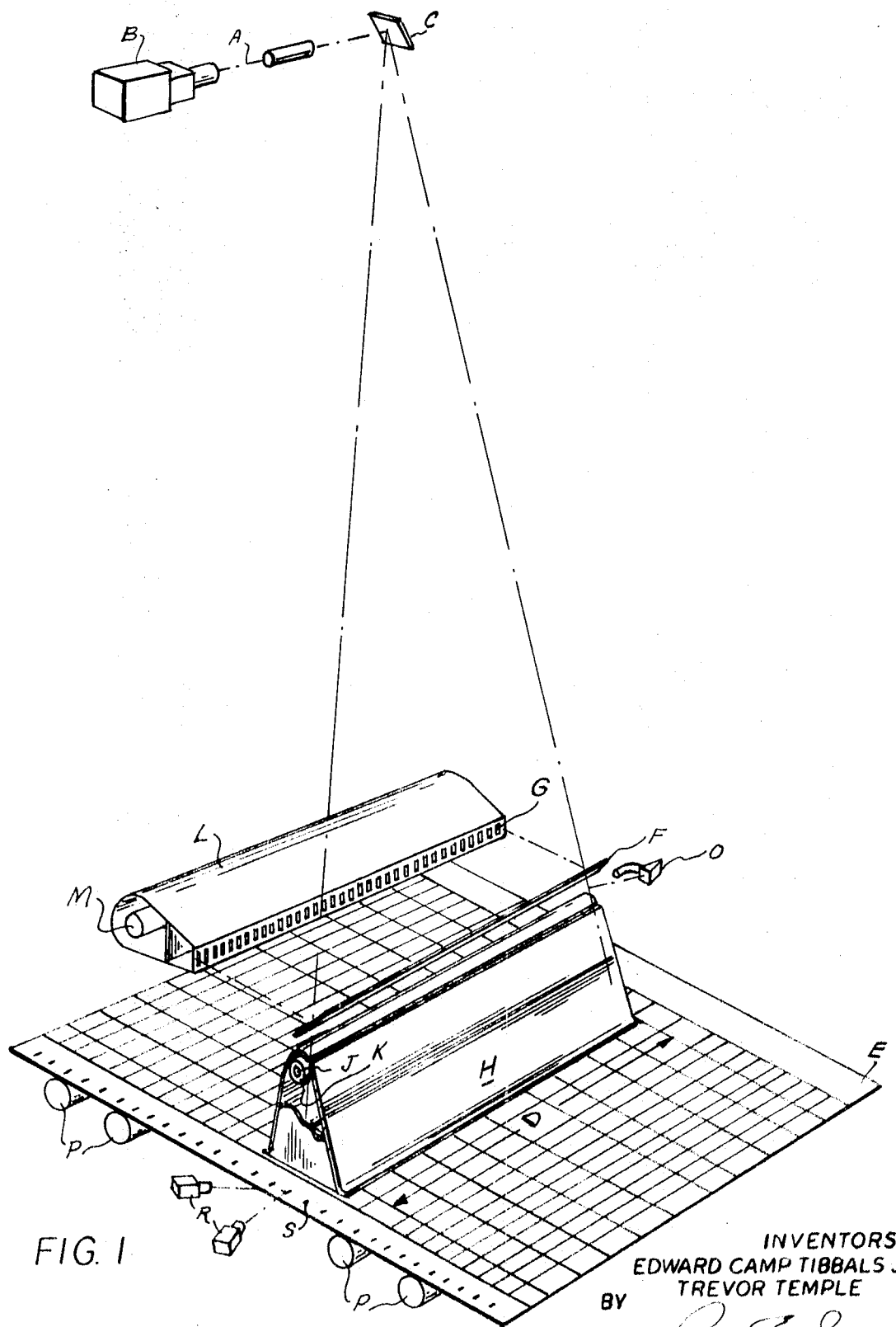
FIG. I
INVENTORS
EDWARD CAMP TIBBALS JR
TREVOR TEMPLE
BY
ATTORNEY

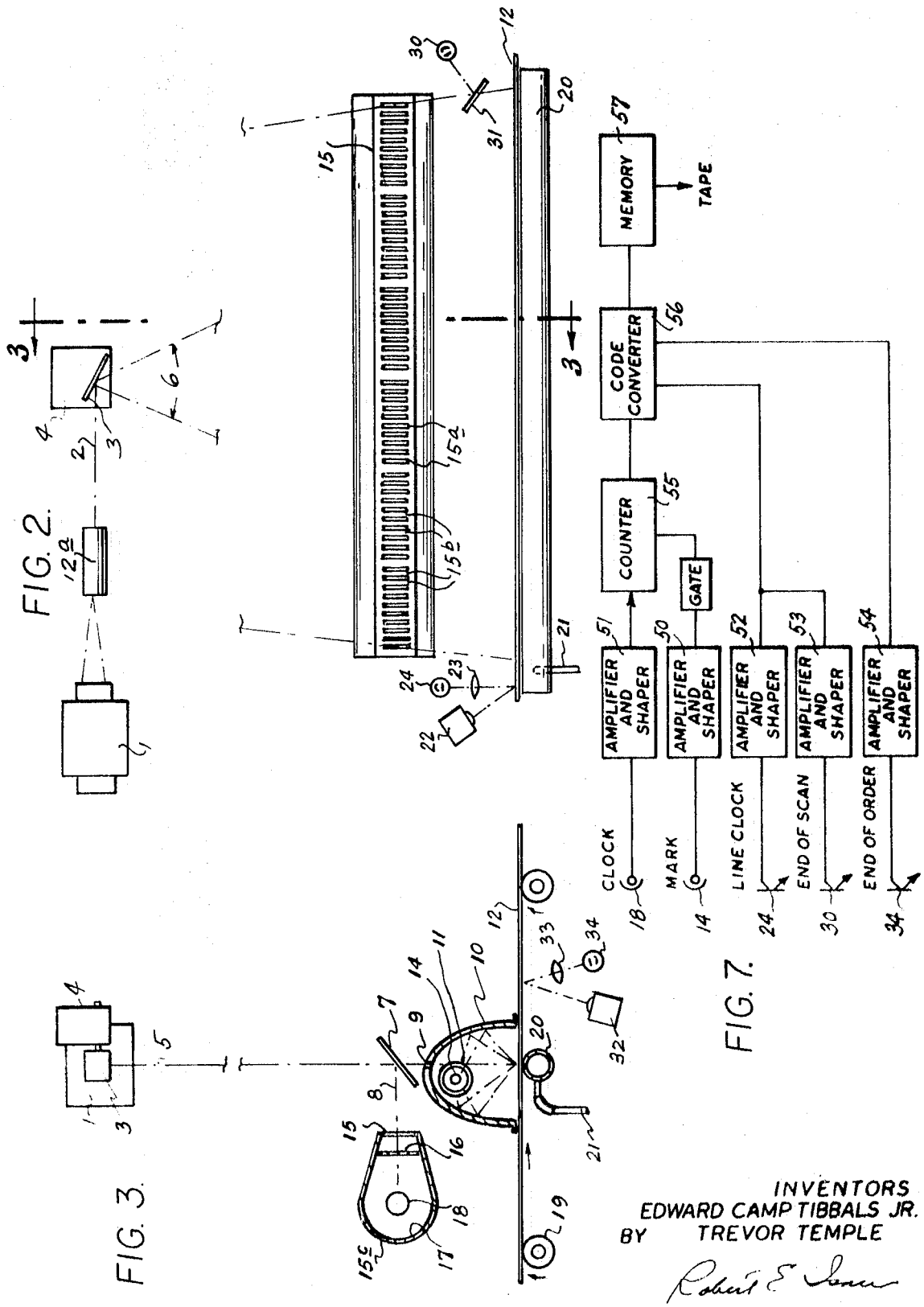

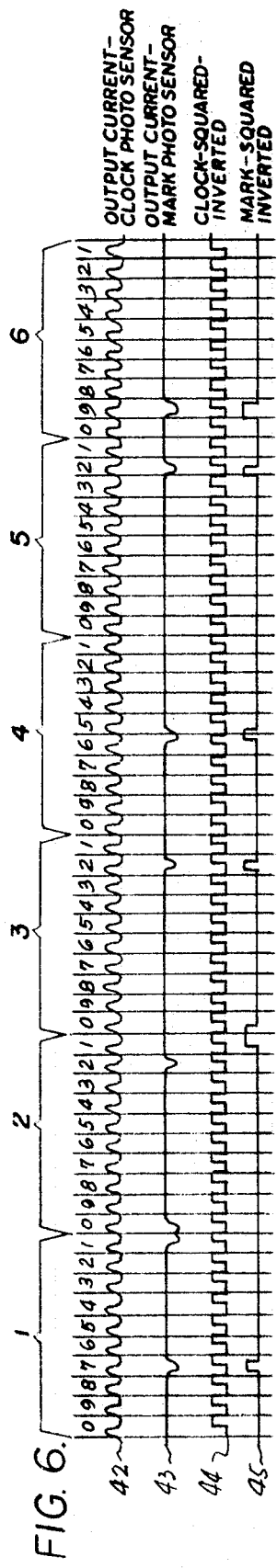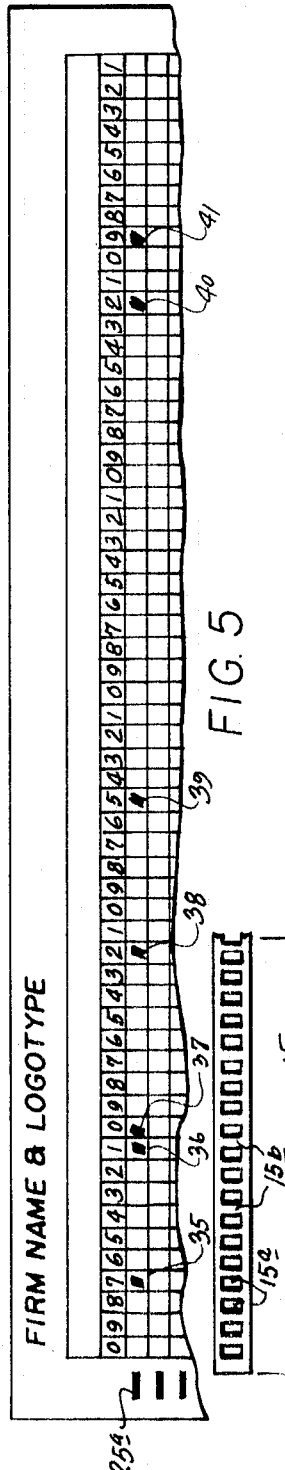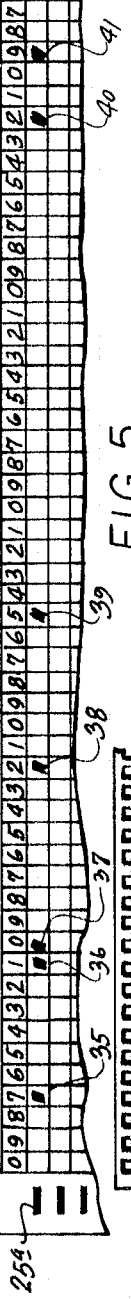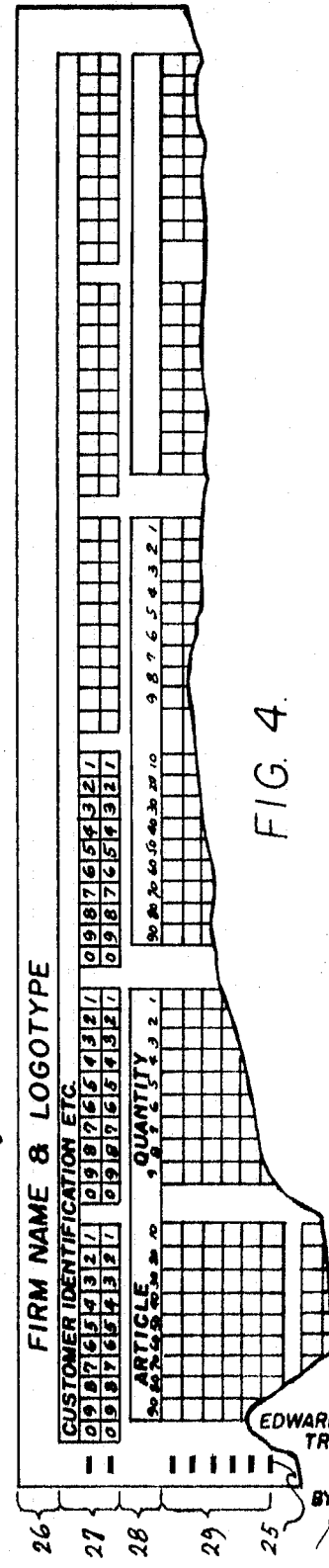

OPTICAL SCANNING UNIT FOR MARK SENSING

This application relates to an improved scanning system for data recognition and conversion of form thereof, and in particular to improved constructions for optical mark sensing-type data scanning and conversion units for provision of coded input information for electronic computers and the like.

The preparation of input data for electronic computers, because of its continuing and redundant nature, oftentimes limits the inherent advantage and diversity of computer use. In particular, the preparation of computer input materials which involve the human conversion of visually observed written data to a digital input code, with its inherent speed limitation and high error probability, presents continual problems. These problems are particularly acute in the processing of merchandise orders, inventory control and other similar endeavors involving the handling of great numbers of discrete documents and great masses of diverse information derived from handwritten notations thereon.

This invention may be briefly described an an improved optical-scanning system for character recognition and code conversion purposes that is particularly adapted for the conversion of data represented by selectively located marks on printed forms into digitally encoded intelligence for a computer input. In its broad aspect the subject invention contemplates the patterned scanning of an intelligence bearing record sheet by a beam of monochromatic light with continuously operable simultaneous coordination of sensed data and beam location for direct conversion of the desired intelligence into digitally encoded form. In its more narrow aspects the subject invention includes the patterned scanning of a record sheet bearing selectively located marks thereon representative of the desired intelligence by a portion of a split laser beam conjointly with the scanning of a selectively prepatterned positioning grid by a second portion of said laser beam and the conversion of electrical signals representative of variations in reflected light from both said portions of said beam into a digital code representative of the desired intelligence.

Among the advantages of the herein described system is, apart from the provision of a relatively simple and inexpensive mark-sensing system, a permitted increase in the information packing density on a scannable record, a selective response limited to marked patterns on the record sheet and concomitant ability to distinguish the same from other visually observable printed matter thereon, increased reliability of the sensed intelligence as occasioned by a marked increase in signal to noise ratio for the sensed signals as well as a permitted increase in both speed and accuracy of scanning and conversion through utilization of a simplified beam reflection system employing a reduced power light source. Still another advantage of the subject invention is the provision of a mark-sensing unit of improved character utilizing a reduced power light source and a markedly reduced number of photosensitive elements. A further advantage of the invention is the provision of a mark-sensing unit having a high order of reliability and lowered manufacturing costs.

The object of this invention is the provision of a relatively simple and inexpensive mark-sensing system that is free of most, if not effectively all, of the liabilities normally attendant paper positioning and ensuing complications that characterize optical-scanning systems in existing equipment.

Other objects and advantages of the subject invention will be set forth in the following specification and will be apparent from the accompanying drawings which illustrate the essentials of a presently preferred construction for a mark-sensing device incorporating the principles of this invention.

Referring to the drawings:

FIG. 1 is an oblique view schematically showing, in somewhat idealized form, the essential components of a mark-sensing system incorporating the principles of this invention.

FIG. 2 is a schematic front elevational view illustrating the operative positional relationship of the major components includable in a presently preferred embodiment of this invention.

FIG. 3 is a sectional view as taken on the line 3-3 of FIG. 2.

FIG. 4 is a fragmentary plan view of a hypothetical order form illustrating the use of a 10-digit line and a six column block of nine digit lines.

FIG. 5 is a fragmentary plan view illustrating a portion of a printed form having a plurality of markings disposed thereon for explanatory purposes in conjunction with the operation of the subject system and additionally schematically showing the relationship of the clocking grid to the form format.

FIG. 6 is a timing chart illustrating the various wave forms extant within the electronic components of the subject device.

FIG. 7 is a schematic block diagram of the suitable logic circuitry employable in the practice of this invention.

Referring to the drawings and initially to FIG. 1, the subject invention broadly includes the utilization of a sharply focused beam of monochromatic light A as emitted from a laser source B which is lineally deflected, as by a moving mirror C, to traverse a linear path across a predetermined scanning distance D as determined by the width of a document E being scanned. Disposed intermediate the document E and the mirror C and angularly disposed adjacent the document surface is a beam splitting mirror F which functions to deflect a portion of the moving beam A through an auxiliary beam locating grid G having a series of discrete spaced openings therein corresponding in a predetermined manner to the document format and, conjointly therewith, to transmit the remaining portion of the beam A onto the surface of the document being scanned. The area of the document being scanned is substantially enclosed by an elliptically shaped mark-sensing light hood H adapted to collect and focus a substantial portion of the light diffusely reflected from the document surface for activation of a photosensitive sensor element J through a selective filter K.

Disposed on the remote side of the beam-locating grid G is a second light hood L adapted to collect the light rays that pass through the apertures in the clocking grid for activation of a second photosensitive sensor element M. Delineation of the finish location for the scanning traverse of the beam A is effected by an auxiliary sensing device such as an end of scan sensor O appropriately positioned relative to the margins of the document being scanned. The document E being scanned is supported upon a roller table P or other suitable means for locating the same relative to the path of scan and to advance the same intermediate each scanning traverse. Auxiliary sensing means, such as a position sensor R is located adjacent the document margin and the longitudinal code marks S thereon so as to provide signals indicative of the longitudinal portion of the document to be scanned by the beam A.

FIG. 4 illustrates a suitable format for a preprinted order form or the like that is readily scannable by this invention. Such form includes a marginal portion 26 bearing the printed firm name or logotype or other indicia. Disposed therebeneath is an address or customer identification section 27 comprising, for example, a preprinted grid made up of two or more transverse lines each including six columns of 10-digit rows. Under the address section 27 is an array of order sections 29 headed by a space 28 for visual identifying indicia in printed form. The order section 29 is constituted by a preprinted grid defining multiline blocks of six column groups of nine digit rows, each double block accommodating markings representative of quantities of from 1 to 99. The left-hand marginal edge includes selectively located marks 25 for selective line identification and for initiation of scan. As will be now apparent, a salesman, for example, will prepare the order by introducing selectively located marks representative of customer identification in the address section 27 and representative of the numerical quantity of one or more articles in the order section 29. Since monochromatic light is employed for scanning, printed matter may be readily imprinted in the same areas that are to receive the marks as long as the printing inks employed will reflect the laser beam light in the same manner as the base paper. Under such conditions the detector will not distinguish between the printed matter and the paper. As such the system will thus be selectively responsive only to the marked patterns thereon and will be possessed of the inherent ability to distinguish between the printed matter and such marked pattern.

FIG. 5 illustrates, for the purposes of example, the inclusion of marks in each of the six column, 10-digit rows in one line delineated by the line mark 25a on an order form together with a segment of the beam locating grid 15 disposed in geometric alignment therewith as the same would be located during a scanning traverse of the line 25a from left to right by the laser beam.

As more clearly shown in FIGS. 2 and 3, there is provided a source of monochromatic light such as a continuous wave gas or crystal laser 1. The output laser beam 2 is desirably focused so as to provide a high intensity scanning spot having a beam diameter as small as 0.010 inches by an auxiliary focusing means 12a. Such sharp focusing permits a high degree of discrimination and detection of both small marks and marks of minimal intensity definition. The laser beam 2 is reflected by an angularly displaceable mirror 3 mounted on the coil of a galvanometer 4 or on a rotating element such as a motor shaft or the like. As indicated by the angular sector 6, the angular displacement of the mirror 3 effects a displacement of the laser beam through a predetermined distance in a straight line across one line of the document 12 being scanned and whose rate of displacement can be readily controlled by either electric current or potential in the form of shaped pulses applied to the mirror drive unit. As will become apparent hereafter, the rate of displacement or variations thereof are of no consequence in the subject system. Located in the path of traverse of the laser beam is an elongate beam splitting member 7, suitably a thinly silvered mirror which is disposed closely adjacent to the surface of the document 12 being scanned and at a predetermined angle with respect thereto. The impingement of the laser beam up on the beam splitter 7 results in the reflection of a portion 8 thereof through the beam locating grid assembly 15, which is so constituted as to provide a plurality of selectively located rectangular apertures 15a defined by intermediate webs 15b (see FIG. 5) of predetermined dimension so as to correspond with the particular columnar format of the document being scanned. Preferably each discrete area on the document to be scanned is matched to one aperture and one each on the clocking grid. The portion 8 of the reflected ray directed through the grid 15 is sequentially interrupted by the web members 15b incorporated therein during its passage thereacross to provide a predetermined pattern of varying light intensity on the downstream side thereof. The grid 15 is preferably enclosed in a light collecting hood 15e which contains a filter 16 opening into a diffusely reflectant integrating chamber 17 containing photosensitive element such as an elongate photomultiplier tube 18. As will be apparent, the filter 16 is so constituted as to pass only light corresponding in frequency to the laser beam and such, in combination with the hood 15c and chamber 17, minimizes, if not eliminates, the deleterious noise effects that might otherwise result from stray or random light impingement upon the photomultiplier tube 18. The variations in light intensity on the downstream side of the clocking grid 15 occasioned by the sweep of the beam 8 therepast will complementally modulate the output of the photomultiplier tube 18. The output of the photomultiplier tube 18 constitutes a series alternating electrical pulses 42 (FIG. 6) with each positive peak thereof corresponding to the passage of the laser beam through a grid aperture and the adjacent negative peaks corresponding to passage of the beam past the adjacent web and, as such, provides an internal clocking system which always digitally indicates the position of the laser beam with respect to all locations on the line of the document being read.

The clocking grid 15 may suitably comprise a readily replaceable unit such as a prepatterned strip of film or the like that has been prepared for use with a particular document format. Such replaceability greatly widens the potential utility of the subject scanning system since it provides the ready capability of accommodating a multiplicity of different document formats on a single piece of equipment.

If two dimensional beam locations are desired such can be effected by merely utilizing an additional beam splitter and clocking grid assembly with apertures arranged perpendicularly to those of the primary system. One immediate application of such a dual unit system would be for the purposes of character recognition wherein recognition is accomplished by correlating the X and Y coordinates of the character defining areas with a stored standard therefor. In such a system the vertical sweep would be of limited length (as determined by letter height) but would require a much higher rate of traverse. A suitable high-speed scanning system is disclosed in copending application Ser. No. 664,877, filed Aug. 31, 1967.

The other end remaining portion of the laser beam that passes through the beam splitter 7 strikes the surface of the document 12 being scanned after its passage through a slit aperture 9 in an elliptically shaped light collecting hood member 10 which substantially completely encloses the area of the document 12 being traversed by the laser beam. Such light, after striking the document surface at the other focus of the ellipse is diffusely reflected therefrom and by measuring the total hemispherical radiant energy as so diffusely reflected, the presence or absence of a mark can be detected. To this end the elliptically shaped hood 10 contains a second elongate photomultiplier tube 14 located at one focus of the ellipse and surrounded by a filter 11 that selectively permits passage of only the laser frequency light therepast.

The output of the mark-sensing photomultiplier tube 14, which normally will be at full current because of the maximum amount of light reflected by the document surface, will drop as the laser beam passes over a mark in its passage across the document, as illustrated by the wave form 43 on FIG. 6.

As will now be apparent, the output of the mark sensing photomultiplier 14, when correlated with the clocking signal emanating from the photomultiplier 18 provides a composite signal that completely delineates the intelligence of the information described on the document by the pattern or placement of marks thereon.

As also shown on FIGS. 2 and 3 the unit includes a suitable paper drive assembly, schematically designated by the roller 19, to advance the document being scanned in a direction transverse to the path of displacement of the laser beam to permit the sequential traverse of succeeding lines thereof. In order to assure a fixed location for the portion of the document 12 being scanned by the laser beam, an elongate suction chamber 20 connected by a pipe 21 to a source of partial vacuum underlies a perforated document supporting platform or the like. The identity of the line 25 being scanned is indicated by the response of a photocell 24 located to respond to light intensity variations caused by the passage of line marks 25 past a light source 22 and a beam concentrating lens 23. The termination of the scanning traverse is detected by means of an auxiliary mirror 31 angularly disposed to direct the laser beam into a second photocell 30. A separate sensing device, comprising light source 32, lens 33 and photocell 34, is disposed beneath the scanned document to signal the completion of its passage past the scanning location.

As will be apparent from line 43 on FIG. 6, the variations in mark intensity, position and size of the deposited marks on the record will result in signals emanating from the mark-sensing photomultiplier that depart from ideal pulse shape both in width and amplitude. Because, however, the information is of a digital nature, these irregular wave forms can be readily reshaped as shown in line 45 and subsequently treated in the electronic components so as to allow the information represented thereby to be properly encoded in the system and correlated with the beam position signal resulting from the clocking grid. FIG. 6 illustrates, in highly schematic block diagram form, the nature of suitable electronic components that are utilizable for handling of the digital-type data produced by the above system. As there shown, the output signals of the mark-sensing photomultiplier tube 14 and the clocking tube 18 as well as the monopulse outputs of the auxiliary photocells 24, 30, and 34, are readily fed into respective amplifier and shaping unit 50—54 respectively to convert the same into a form approaching that of rectangular pulses. The squared clock pulse output of the amplifier 51 is fed into a counterunit 55 which also is adapted to receive the monopulse-type output of the mark-sensing signal amplifier 50. The counterunit 55 correlates these signals with relation to each other and feeds them into a code converting unit 56, for conversion of the correlated signals into a form convenient for introduction of the converted data into a memory unit 57. As indicated, the signals emanating from the line clock photocell amplifier 52, the end of scan signal amplifier 53, and the end of order amplifier 54 are likewise fed into the code conversion unit 56 for proper correlation with the signals emanating from the counting unit 55 so as to properly encode and correlate the information relative to each line of each particular order into the memory unit for subsequent readout onto magnetic tape or other record.

As will be apparent to those skilled in this art, the particular electronic circuitry and logic components required will be designed to meet the exigencies of a particular order form and type of data required therefrom and as pointed out earlier, may also include the necessary circuits for discrimination and correction of errors associated with the incorrect mark placement and imperfect marks.

As will now be apparent from the foregoing the system is possessed of a number of unique advantages, among which are (a) selective response to added marks and concomitant ability to distinguish between printed matter and marked patterns, (b) minimization of random noise in entry signals to electronic components with enhanced reliability due to greater signal to noise ratio as so obtained, (c) reduced power and expense of both light source and in photosensitive components (d) permitting increase in packing density of scannable information (e) simplicity of construction with enhanced speed and accuracy and (f) avoidance of analog to digital conversion in the preparation of input computer data.

Having thus described my invention, we claim:

1. Optical-scanning apparatus comprising laser means for producing a beam of monochromatic light, means for lineally deflecting said beam through a predetermined distance transversely across the surface of a record to be scanned, means to displace said record in a direction perpendicular to the path of travel of said beam, a light confining hood assembly extending over the path of travel of said beam and containing means selectively responsive only to light intensity variations induced by the passage of said beam over intelligence representing indicia located on said record surface for providing first discrete electrical signals representative thereof, clocking grid means disposed adjacent said record surface including a masking element defining a multiplicity of discrete apertures separated by light impervious wall members for incrementally subdividing said predetermined distance into a predetermined number of discrete segments prepatterned in accord with the intelligence being scanned, beam splitting means disposed adjacent to said record surface and extending over the path of travel of said lineally deflected beam for directing a portion of said beam through the masking element of said clocking grid during the lineal deflection thereof through said predetermined distance, and means responsive to the light intensity variations induced by the sequential blockage and passage of said portion of said beam through said masking element during its traverse thereof for providing a sequence of second discrete electrical signals selectively representative of the location of said beam at all times during the traverse of said record whereby correlation of said first electrical signals with the complemental signals in said sequence of second discrete signals defines the location and nature of said intelligence representing indicia on said record.

2. Optical-scanning apparatus as set forth in claim 1 including means for sensing the location of the lineally deflected beam longitudinally of said record to provide a third electrical signal indicative of the location thereof longitudinally of said record and operative with said second electrical signals to provide a two-dimensional indication of the physical location of said beam.